Jay Densmore's Rotating Tooth Cultivator

71589

PATENTED
DEC 3 1867

Witnesses
L. Shipman
Thomas Bell

Inventor
Jay Densmore

United States Patent Office.

JAY DENSMORE, OF HOLLEY, NEW YORK, ASSIGNOR TO L. A. DENSMORE AND HIRAM CURTIS.

Letters Patent No. 71,589, dated December 3, 1867.

IMPROVEMENT IN ROTATING-TOOTH CULTIVATOR.

*The Schedule referred to in these Letters Patent and making part of the same.*

TO ALL WHOM IT MAY CONCERN:

Be it known that I, JAY DENSMORE, of Holley, in the county of Orleans, and State of New York, have invented a new and useful Rotating-Tooth Cultivator; and I do hereby declare that the following is a full, clear, and exact description of the construction and operation of the same, reference being had to the annexed drawings, making a part of this specification, in which—

Figure 1:
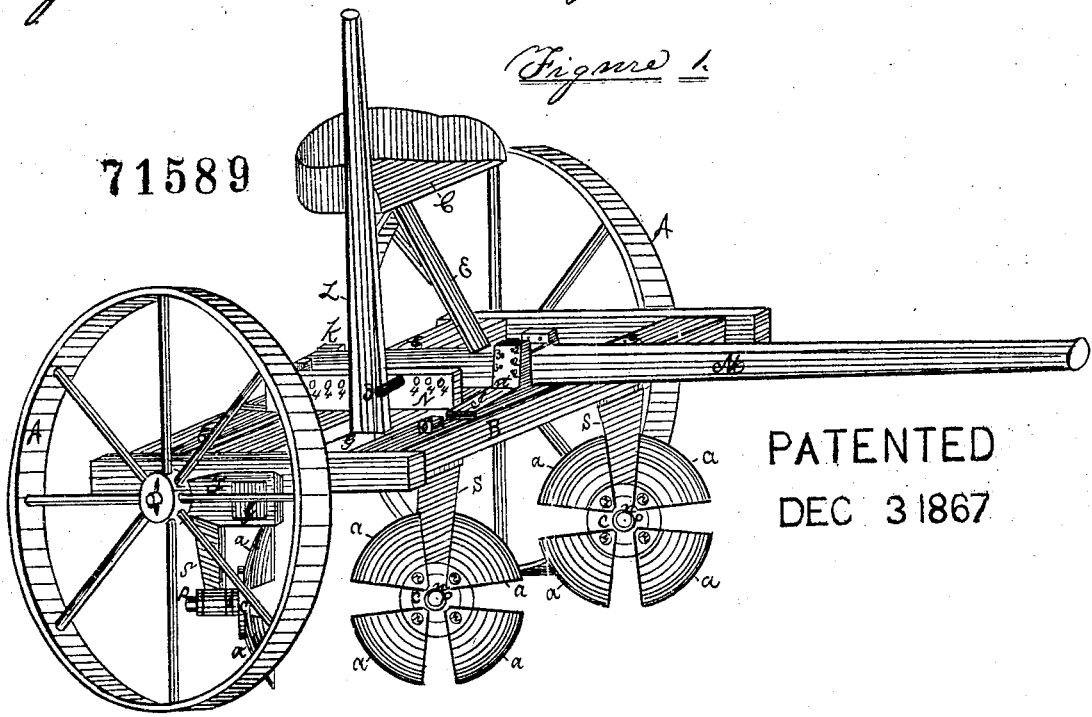

Figure 1 is a perspective view, and

Figure 2:
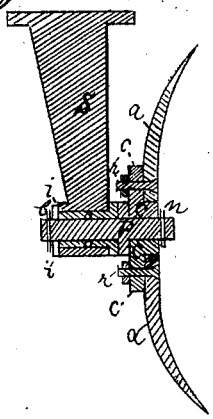

Figure 2 a longitudinal section of the tooth and standard.

I construct my cultivator of the frame B, mounted upon the wheels A A, by means of the cranks F attached to the ends of the shaft G, the crank-pins $w$ being the arms upon which the wheels revolve. To the shaft G is attached the lever L, by means of which the frame B is raised or lowered, and is held in position at any desired point by means of the pin 3 inserted in any one of the holes 4 4 4 4 4 4 4 in the cross-bar N. The draught-pole M is attached to the frame B by means of the guides K and I. The forward end of the frame B is raised or lowered by raising or lowering the pin $t$ in the guide I. The driver's seat C is attached by means of the spring E. The teeth are constructed of the hub $c$, to which are bolted the wings or teeth $a\ a\ a\ a$, or their equivalents, more or less. The pin P is held securely in the hub by the key $n$, and revolves in the bush $o$ in the journal in the bottom of the standard S, the bush $o$ and pin P being both held in place by the washer $i$ and key $l$. The teeth are secured to the frame B by the bolts 6 6 6 6, at an angle to the draught of forty-five degrees, more or less, as may be desired.

The teeth in the back row are set so as to counteract the side draught of the teeth in the forward row, or *vice versa*, as shown in fig. 1. When the teeth are let down upon the ground, and drawn over it, the shape of the wings or teeth $a\ a\ a\ a$ causes them to enter to any desired depth, and their revolving causes the earth to be very thoroughly stirred and pulverized. The spaces between the wings or teeth $a\ a\ a\ a$ prevent the wet earth from filling up and clogging the centres of the teeth. When the pin P and bush $o$ become worn, they can be renewed at a slight expense and trouble.

What I claim as my invention, and desire to secure by Letters Patent, is—

1. A rotating cultivator-tooth, consisting of any number of teeth, attached to a hub or common centre, around which they are free to revolve, and set at an angle to the draught, substantially as described.

2. The combination and arrangement, with a rotating cultivator-tooth, of the standard S, the pin P, the bush $o$, the washer $i$, and the keys $l$ and $n$, substantially as set forth and described.

3. The combination and arrangement, with a rotating-tooth cultivator, of the frame B, the shaft G, the cranks F, the wheels A A, the lever L, the pin 3, the cross-bar N, and the holes 4 4 4 4 4 4 4, substantially as set forth and described.

4. The combination and arrangement, with a rotating tooth-cultivator, of the pole M, the guides K and I, the pin $t$, the holes 2 2 2 2 2 2, the driver's seat C, and the spring E, substantially as set forth and described.

JAY DENSMORE.

Witnesses:
S. S. SPENCER,
THOMAS BELL.